(12) United States Patent
Bai et al.

(10) Patent No.: US 12,724,629 B2
(45) Date of Patent: Sep. 1, 2026

(54) METHOD FOR REUSING IDENTIFIERS TO IMPROVE PERFORMANCE OF OPEN AND CLOSE INPUT/OUTPUT REQUESTS FOR CLIENT DRIVE REDIRECTION

(71) Applicant: Omnissa, LLC, Mountain View, CA (US)

(72) Inventors: Wu Bai, Beijing (CN); Haiwei Zhao, Beijing (CN); Weigang Huang, Beijing (CN); Feng Yan, Beijing (CN); Kun Shi, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 822 days.

(21) Appl. No.: 17/901,268

(22) Filed: Sep. 1, 2022

(65) Prior Publication Data

US 2024/0028369 A1 Jan. 25, 2024

(30) Foreign Application Priority Data

Jul. 22, 2022 (WO) ................ PCT/CN2022/107311

(51) Int. Cl.
*G06F 9/455* (2018.01)
*G06F 9/4401* (2018.01)

(52) U.S. Cl.
CPC ........ *G06F 9/45558* (2013.01); *G06F 9/4411* (2013.01); *G06F 2009/45579* (2013.01)

(58) Field of Classification Search
CPC ............... G06F 9/45558; G06F 9/4411; G06F 2009/45579
See application file for complete search history.

(56) References Cited

U.S. PATENT DOCUMENTS 8,732,354 B1 * 5/2014 Salli ...................... G06F 3/0635 710/36
9,992,309 B2 * 6/2018 Kawazoe ................ H04L 69/16
10,162,472 B1 12/2018 Joyce et al.
10,656,841 B1 5/2020 Huang et al.
10,929,042 B2 2/2021 Matsui et al.
11,418,582 B1 * 8/2022 Swain ................... H04L 67/145
11,455,689 B1 * 9/2022 Friedman ............... G06Q 40/06
2002/0059428 A1 * 5/2002 Susai .................. H04L 67/1008 709/227

(Continued)

OTHER PUBLICATIONS

Notice of Allowance mailed Nov. 9, 2023 in U.S. Appl. No. 17/901,321, 12 pages.

*Primary Examiner* — Pierre Vital
*Assistant Examiner* — Tuan M Nguyen
(74) *Attorney, Agent, or Firm* — Kim & Stewart LLP

(57) ABSTRACT

A method of performing open and close input/output (I/O) requests targeting a directory of a client computing device includes the steps of: receiving a first I/O request to open the directory, from a driver of a host server, forwarding the first I/O request to the client computing device; in response to the first I/O request, receiving an identifier (ID) of the directory from the client computing device and transmitting the ID to the driver; in response to receiving a second I/O request to close the directory, from the driver, storing the ID in a cache, and not forwarding the second I/O request to the client computing device; and in response to receiving a third I/O request to open the directory, from the driver, retrieving the ID from the cache, and transmitting the ID to the driver again.

17 Claims, 5 Drawing Sheets

(56) References Cited

U.S. PATENT DOCUMENTS

| | | | | |
|---|---|---|---|---|
| 2015/0220275 | A1 | 8/2015 | Oh et al. | |
| 2017/0315833 | A1* | 11/2017 | Vajravel | G06F 9/45558 |
| 2018/0332078 | A1* | 11/2018 | Kumar | H04L 63/0815 |
| 2019/0250827 | A1* | 8/2019 | Gutta | G06F 13/1668 |
| 2021/0120619 | A1* | 4/2021 | Nimmala | H04L 1/1664 |
| 2022/0229922 | A1* | 7/2022 | Huang | H04L 67/025 |

* cited by examiner

| Reusable IDs Cache 172 | | | |
|---|---|---|---|
| No. | Key | | Value |
| 1 | Open Parameters 210 | Path 212 | ID 214 |
| 2 | Open Parameters 220 | Path 222 | ID 224 |
| 3 | Open Parameters 230 | Path 232 | ID 234 |

METHOD FOR REUSING IDENTIFIERS TO IMPROVE PERFORMANCE OF OPEN AND CLOSE INPUT/OUTPUT REQUESTS FOR CLIENT DRIVE REDIRECTION

CROSS-REFERENCE

This application is based upon and claims the benefit of priority from International Patent Application No. PCT/CN2022/107311, filed on Jul. 22, 2022, the entire contents of which are incorporated herein by reference.

BACKGROUND

Many organizations rely on remote desktop services to provide lean, flexible computing environments. Client drive redirection (CDR) is one important feature required by the end user of a remote desktop service. CDR enables a user of a remote desktop session to share files and directories between a client computing device and a host server. The user designates a directory of the client computing device to be a "shared directory." The shared directory is visible from within the remote desktop session such that the user can see the names of subdirectories and files therein even though the content of the files is stored on the client computing device.

Through the remote desktop session, the user can copy files from the shared directory to a local directory of a file system of the host server. Such copying involves a CDR agent of the host server transmitting a series of input/output (I/O) requests to the client computing device and a CDR client of the client computing device transmitting responses to the host server. For example, if the user selects to copy a subdirectory of the shared directory, the series of I/O requests and responses are divided into a listing phase and a copying phase. During the listing phase, the CDR agent acquires the names of all the files in the subdirectory and creates an ordered list therefrom for the file system of the host server. During the copying phase, the CDR agent acquires the content of the files being copied, which is stored in the local directory of the host server.

During both the listing and copying phases, the CDR agent transmits several I/O requests to the CDR client, and the CDR client transmits several responses to the CDR agent. Many of the I/O requests transmitted to the CDR client are identical open and close I/O requests, and several of the responses transmitted to the CDR agent are identical responses. Because copying includes the transmission of many I/O requests and responses between the client computing device and the host server, the copying is inefficient and often creates a bottleneck in the remote desktop experience.

Copying is especially slow when there is poor network performance between the client computing device and the host server, and copying performance degrades as the number of relatively small files being copied increases. Often times, the copying of a small file does not include as many read I/O requests and responses as the copying of a large file. However, the copying still includes many additional I/O requests and responses, including identical open and close I/O requests and responses, which contribute to the inefficiency. A more efficient method for copying files to a host server via CDR is needed.

SUMMARY

Accordingly, one or more embodiments provide a method of performing open and close input/output (I/O) requests targeting a directory of a client computing device during a process of copying a plurality of files of the directory from the client computing device to a host server that is hosting a remote desktop accessed by the client computing device. The method includes the steps of: receiving a first I/O request to open the directory, from a driver of the host server; forwarding the first I/O request to the client computing device; in response to the first/O request, receiving an identifier (ID) of the directory from the client computing device and transmitting the ID to the driver; in response to receiving a second I/O request to close the directory, from the driver, storing the ID in a cache, and not forwarding the second I/O request to the client computing device; and in response to receiving a third I/O request to open the directory, from the driver, retrieving the ID from the cache, and transmitting the ID to the driver again.

Further embodiments include a non-transitory computer-readable storage medium comprising instructions that cause a remote desktop system to carry out the above method, as well as a remote desktop system configured to carry out the above method.

DETAILED DESCRIPTION

Figure 1:
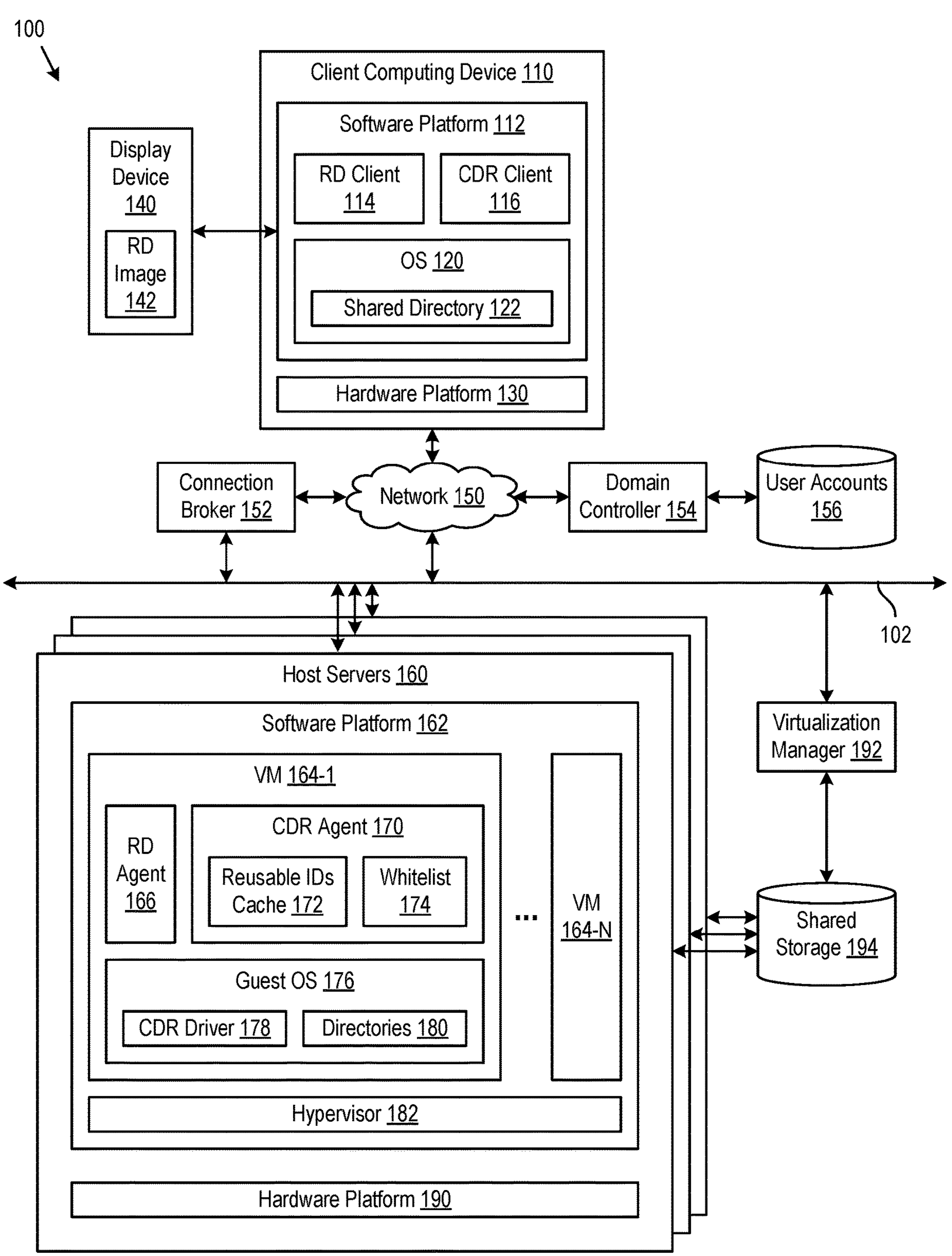
FIG. 1 is a block diagram of a virtualized computer system in which embodiments may be implemented.

Techniques for copying files from a client computing device to a host server via CDR are described. The files are copied from a shared directory to a local directory of a file system of the host server. The shared directory stores files of the client computing device, and the host server stores the names of files and subdirectories of the shared directory such that the names are visible to a user via a remote desktop session. According to embodiments, during the copying of files, a CDR driver of the host server generates I/O requests, which are handled by a CDR agent of the host server. The generated I/O requests include a plurality of "create I/O requests" targeting the same subdirectory of the shared directory, create I/O requests being I/O requests to either open existing files or directories or to create new files or directories. Such create I/O requests are also referred to herein as "open I/O requests" when used for opening existing files or directories. The generated I/O requests also include a plurality of "close I/O requests" targeting the same subdirectory of the shared directory, close I/O requests being I/O requests to close existing files or directories.

According to embodiments, the CDR agent manages a cache of IDs of subdirectories of the shared directory, which the CDR agent leverages to efficiently handle open and close I/O requests. Using the cache, the CDR agent transmits less open and close I/O requests to a CDR client of the client computing device, which also reduces the number of responses to open and close I/O requests transmitted by the CDR client to the CDR agent. The response to an open I/O request is an identifier (ID) of a targeted file or directory. The response to a close I/O request is a Boolean value indicating whether a targeted file or directory is successfully closed.

To reduce the numbers of open I/O requests and responses, when the CDR driver generates an open I/O request targeting a subdirectory of the shared directory, the CDR agent checks the cache for an entry including the ID of the subdirectory. If the CDR agent does not find the ID, the CDR agent forwards the open I/O request to the CDR client to obtain the ID of the targeted subdirectory to return to the CDR driver and store in the cache. Later, upon receiving another open I/O request targeting the same subdirectory, instead of forwarding the open I/O request to the CDR client, the CDR agent retrieves the ID of the subdirectory from the cache and returns it to the CDR driver.

To reduce the numbers of close I/O requests and responses, when the CDR driver generates a close I/O request targeting a subdirectory of the shared directory, the CDR agent does not forward the close I/O request to the CDR client. The CDR agent waits until a predetermined amount of time elapses in which the ID of the subdirectory is not retrieved from the cache in response to an open I/O request, i.e., in which the ID is not "reused." When the predetermined amount of time elapses, the CDR agent transmits a close I/O request to the CDR client. However, before the predetermined amount of time elapses, several open and close I/O requests may be generated by the CDR driver without the CDR agent transmitting a close I/O request to the CDR client. Between the reduced numbers of open and close I/O requests and responses thereto, the number of packets transmitted between the client computing device and host server is reduced. This reduction improves the efficiency of copying via CDR, especially when network performance is poor and when copying a large number of small files. These and further aspects of the invention are discussed below with respect to the drawings.

FIG. 1 is a block diagram of a virtualized desktop infrastructure (VDI) system 100 (also referred to as a remote desktop computer system) in which embodiments may be implemented. VDI system 100 includes a client computing device 110 and a plurality of host servers 160 that are remote from client computing device 110, e.g., in a remote data center. Client computing device 110 is constructed on a hardware platform 130 such as an x86 architecture platform. Hardware platform 130 includes conventional components (not shown) of a computing device, such as one or more central processing units (CPUs), memory such as random-access memory (RAM), local storage such as one or more magnetic drives or solid-state drives (SSDs), and one or more network interface cards (NICs). The NIC(s) enable client computing device 110 to communicate with host servers 160 over a physical network 150 such as the Internet.

Client computing device 110 includes a software platform 112 on which a remote desktop (RD) client software program 114 and CDR client software program 116 run on an operating system (OS) 120, which is a commodity OS. The term "desktop" refers to the instance of an interactive operating environment provided by an OS and software applications, typically in the form of display and sound output and keyboard and mouse input. With RD client 114, a user accesses an RD that is running in a remote data center, from any location. For example, RD client 114 may be VMware Horizon® client, available from VMware, Inc., or a special purpose thin client such as those available from Dell, HP, NEC, Sun Microsystems, and Wyse.

A virtual machine (VM) in one of host servers 160 transmits an image 142 of the RD to RD client 114, which communicates with a display device 140 such as a monitor on which the user views RD image 142. Additionally, as a feature of the RD, OS 120 manages a shared directory 122, the names of files and subdirectories therein being stored in host server 160 such that the names are visible to the user via the RD. CDR client 116 receives and executes I/O requests from host server 160 regarding the visible files and subdirectories, and CDR client 116 transmits responses to the I/O requests to host server 160.

VDI system 100 includes a domain controller 154 such as Microsoft Active Directory® that manages user accounts 156 including the user's log-in information for the RD. VDI system 100 also includes a connection broker 152 that manages connections between RD client 114 and a VM running the user's RD. Connection broker 152 and domain controller 154 may run on separate servers or in separate VMs running on the same server or different servers.

In embodiments illustrated herein, RDs are running in VMs 164. VMs 164 are instantiated on a plurality of host servers 160, each of which includes a software platform 162 and a hardware platform 190. Hardware platform 190 is, e.g., a server-grade x86 architecture platform including the conventional components of a computing device described above for hardware platform 130. CPU(s) of hardware platform 190 are configured to execute instructions such as executable instructions that perform one or more operations described herein, which may be stored in memory of hardware platform 190. Software platform 162 includes a hypervisor 182, which is a virtualization software layer that supports a VM execution space within which VMs 164 are concurrently instantiated and executed. One example of hypervisor 182 is a VMware ESX® hypervisor, available from VMware, Inc.

Each of host servers 160 is controlled by a virtualization manager 192, and hardware platform 190 of each of host servers 160 is coupled to a shared persistent storage system 194. Virtualization manager 192 logically groups host servers 160 into a cluster to perform cluster-level tasks such as provisioning and managing VMs 164 and migrating VMs 164 from one of host servers 160 to another. Virtualization manager 192 communicates with host servers 160 via a management network (not shown) provisioned from a physical network 102 such as a local area network (LAN) of a remote data center. Virtualization manager 192 may be, e.g., a physical server or one of VMs 164. One example of virtualization manager 192 is VMware vCenter Server,® available from VMware, Inc.

VM 164-1 includes an RD agent software program 166 and a CDR agent software program 170 running on a guest OS 176, which is a commodity OS. Guest OS 176 includes a CDR driver 178 that generates I/O requests regarding the visible files and subdirectories of shared directory 122. One example of CDR driver 178 is a remote desktop protocol device redirector (RDPDR) driver from Microsoft. Guest OS 176 manages directories 180 in a file system, directories 180 being local directories of host server 160 into which files of shared directories 122 are copied, according to embodiments.

RD agent 166 communicates with RD client 114 to establish a session for the user's RD. RD image 142 is generated in VM 164-1 and transmitted by RD agent 166 to RD client 114 to be displayed on display device 140. CDR agent 170 handles I/O requests generated by CDR driver 178, including transmitting I/O requests to CDR client 116 and transmitting responses to I/O requests to CDR driver 178. To handle I/O requests, CDR agent 170 manages a reusable IDs cache 172, which stores IDs of subdirectories of shared directory 122 to be retrieved and returned to CDR driver 178 in response to open I/O requests, as discussed further below in conjunction with FIG. 2. CDR agent 170 also uses a whitelist 174 to determine which IDs to store in reusable IDs cache 172, as discussed further below in conjunction with FIG. 6. A particular configuration of VDI system 100 is illustrated in FIG. 1, but it should be recognized that one or more embodiments may be practiced with other computer system configurations.

Figures 2, 3:
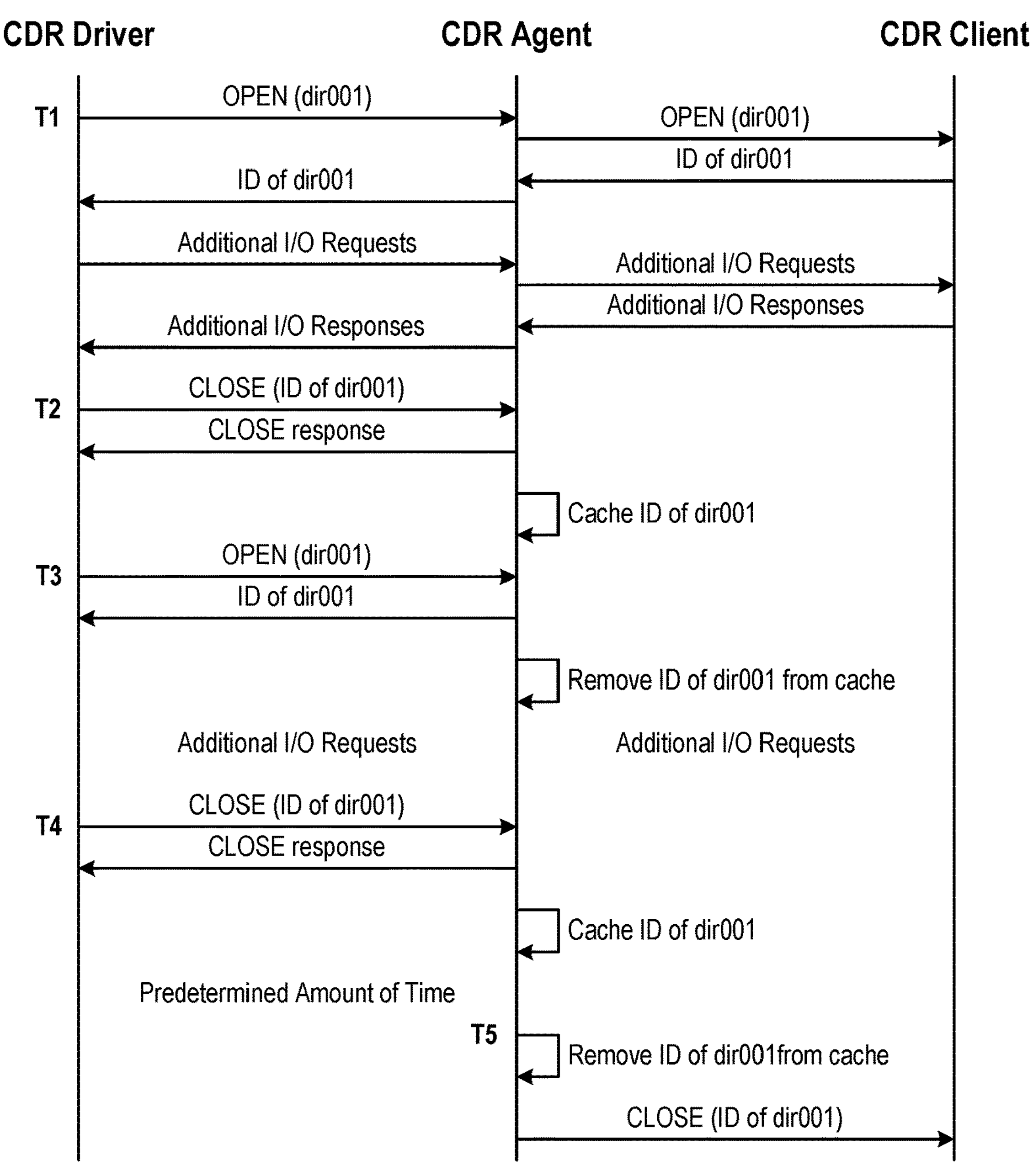
FIG. 2 is a block diagram illustrating an example of a cache of IDs of subdirectories of a shared directory of a client computing device, to be retrieved in response to open I/O requests targeting the subdirectories.
FIG. 3 is a sequence diagram illustrating an example of handling open and close I/O requests targeting a subdirectory of the shared directory.

FIG. 2 is a block diagram illustrating an example of reusable IDs cache 172. For each key-value entry of reusable IDs cache 172, the key includes a set of parameters of an open I/O request generated by CDR driver 178 such as a "ShareAccess" flag, which indicates whether multiple threads of execution should be allowed to access a subdirectory of shared directory 122 targeted by the open I/O request. The key also includes a path to the targeted subdirectory. For each open I/O request whose parameters are stored in reusable IDs cache 172, the value of the ShareAccess flag indicates that multiple threads of execution should be allowed. The value of each entry of reusable IDs cache 172 is an ID of the targeted subdirectory.

In the example of FIG. 2, reusable IDs cache 172 includes three entries. The first, second, and third entries include parameters 210, 220, and 230 of open I/O requests, respectively. Open parameters 210 are parameters of an open I/O request targeting a subdirectory of shared directory 122, the subdirectory having an ID 214. Open parameters 220 are parameters of an open I/O request targeting a subdirectory with an ID 224, and open parameters 230 are parameters of an open I/O request targeting a subdirectory with an ID 234. The first, second, and third entries also include paths 212, 222, and 232 to subdirectories of respective open I/O requests. CDR agent 170 caches IDs 214, 224, and 234 after receiving responses to open I/O requests targeting the subdirectories. Specifically, CDR agent 170 stores the IDs upon receiving subsequent close I/O requests targeting the subdirectories, as discussed further below in conjunction with FIG. 3. Later, if CDR driver 178 generates an open I/O request matching open parameters 210 and path 212, open parameters 220 and path 222, or open parameters 230 and path 232, CDR agent 170 retrieves the corresponding one of IDs 214, 224, and 234 from reusable IDs cache 172 and returns the retrieved ID to CDR driver 178.

FIG. 3 is a sequence diagram illustrating an example of handling open and close I/O requests targeting a subdirectory of shared directory 122. At a time 1, CDR driver 178 generates an open I/O request targeting the subdirectory, which has the name "dir001," and transmits the open I/O request to CDR agent 170. In response, CDR agent 170 checks reusable IDs cache 172 for a key matching parameters and a path of the open I/O request generated at time 1. Because there is no entry with a key matching the parameters and path, CDR agent 170 forwards the open I/O request to CDR client 116. CDR client 116 then opens dir001 and transmits the ID of dir001 to CDR agent 170 to be forwarded to CDR driver 178.

After receiving the ID, CDR driver 178 generates additional I/O requests. For example, such additional I/O requests may include "query directory" I/O requests, which request metadata about a file of a particular directory. Such additional I/O requests may also include "query information" I/O requests, which request metadata about a particular file or particular directory. Query directory and query information I/O requests may be for "basic information" such as the creation time of a file, "standard information" such as the number of bytes allocated to a file, and "attribute information" such as whether a file is read-only. Such additional I/O requests may also include "volume information" I/O requests, which request information about a volume such as its capacity. Such additional I/O requests may also include "read" I/O requests, which request data of a file. CDR agent 170 transmits the additional I/O requests, e.g., one at a time, to CDR client 116. CDR client 116 performs the additional ID requests and transmits responses to the additional I/O requests, e.g., one at a time, to CDR agent 170 to be forwarded to CDR driver 178.

At a time 2, CDR driver 178 generates a close I/O request targeting dir001, the close I/O request including the ID of dir001 as a parameter, and transmits the close I/O request to CDR agent 170. Instead of forwarding the close I/O request to CDR client 116, CDR agent 170 transmits a response to CDR driver 178 indicating that dir001 was successfully closed. However, dir001 remains open in shared directory 122 of client computing device 110. Additionally, CDR agent 170 stores the ID of dir001 in reusable IDs cache 172 along with the parameters and path of the open I/O request generated at time 1.

At a time 3, CDR driver 178 generates another open I/O request targeting dir001. In response, CDR agent 170 checks reusable IDs cache 172 for a key matching parameters and a path of the open I/O request generated at time 3. Because there is such an entry, which includes the ID of dir001, CDR agent 170 retrieves the ID from the entry and transmits the ID to CDR driver 178. CDR agent 170 then removes the ID from reusable IDs cache 172 by deleting the entry. After CDR agent 170 removes the ID from reusable IDs cache 172, CDR driver 178 generates additional I/O requests to be handled by CDR agent 170 and CDR client 116 such as query directory, query information, volume information, and read I/O requests.

At a time 4. CDR driver 178 generates another close I/O request targeting dir001 and transmits the close I/O request to CDR agent 170. Instead of forwarding the close I/O request to CDR client 116, CDR agent 170 transmits a response to CDR driver 178 indicating that dir001 was successfully closed. However, dir001 remains open in shared directory 122 of client computing device 110. Additionally, CDR agent 170 again stores the ID of dir001 in reusable IDs cache 172 along with the parameters and path of the open I/O request generated at time 3 (which are the same as the parameters and path of the open I/O request generated at time 1).

Then, a predetermined amount of time elapses in which CDR driver 178 does not generate an open I/O request matching the parameters and path of the open I/O request generated at time 3. Such a predetermined amount of time elapsing is also referred to herein as an entry of reusable IDs cache 172 timing out. At a time 5, in response to the timing out, CDR agent 170 removes the ID of dir001 from reusable IDs cache 172 by deleting its entry, and CDR agent 170 transmits a close I/O request to CDR client 116 targeting dir001. CDR client 116 then closes dir001.

In the example of FIG. 3, this invention reduces the number of packets transmitted between client computing device 110 and host server 160. For example, CDR agent 170 only forwards a single open I/O request to CDR client 116, which was generated at time 1, instead of forwarding an additional open I/O request generated at time 3. Additionally, CDR agent 170 only transmits a single close I/O request to CDR client 116 after time 5 instead of forwarding two close I/O requests generated at times 2 and 4.

Figure 4:
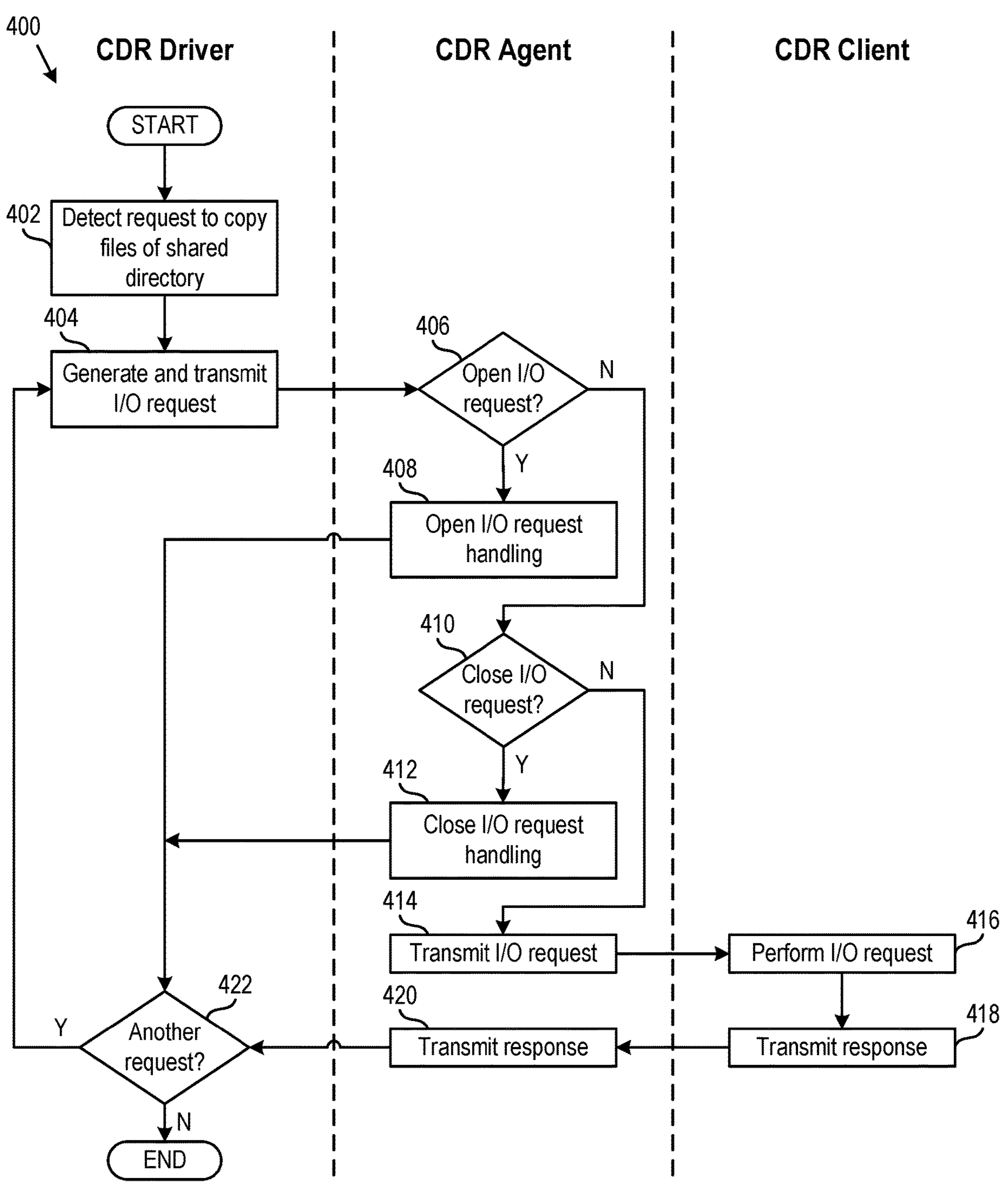
FIG. 4 is a flow diagram of steps performed by a CDR driver and CDR agent of a host server and a CDR client of the client computing device to carry out a method of handling I/O requests, according to an embodiment.

FIG. 4 is a flow diagram of steps performed by CDR driver 178, CDR agent 170, and CDR client 116 to carry out a method 400 of handling I/O requests for copying files from shared directory 122 to one of directories 180 of host server 160, according to an embodiment. At step 402, CDR driver 178 detects a request to copy files of shared directory 122. For example, the user may have "dragged and dropped" a subdirectory to the one of directories 180. At step 404, CDR driver 178 generates an I/O request and transmits the I/O request to CDR agent 170.

At step 406, CDR agent 170 determines if the I/O request is an open I/O request. If an open I/O request, method 400 moves to step 408, and CDR agent 170 and/or CDR client 116 perform open I/O request handling, as discussed further below in conjunction with FIG. 5. Otherwise, if not an open I/O request, method 400 moves to step 410, and CDR agent 170 determines if the I/O request is a close I/O request. If a close I/O request, method 400 moves to step 412, and CDR agent 170 and/or CDR client 116 perform close I/O request handling, as discussed further below in FIG. 6. Otherwise, if not a close I/O request, method 400 moves to step 414.

At step 414, CDR agent 170 transmits the I/O request to CDR client 116. At step 416, CDR client 116 performs the I/O request. For example, if the I/O request is a query directory or query information I/O request, CDR client 116 obtains metadata about a file or subdirectory of shared directory 122. If the I/O request is a volume information I/O request, CDR client 116 obtains metadata about the volume that includes shared directory 122. If the I/O request is a read I/O request, CDR client 116 obtains data of a file of shared directory 122.

At step 418, CDR client 116 transmits a response to the I/O request to CDR agent 170, e.g., metadata about a file or subdirectory of shared directory 122 or about the volume that includes shared directory 122. Additionally, if the response is to a read I/O request, the response includes data of a file of shared directory 122 to store in a file of one of directories 180. At step 420, CDR agent 170 transmits the response to CDR driver 178 to be used, e.g., for generating another I/O request or for storing data in a file of one of directories 180. At step 422, if there is another I/O request to perform for the copying of the files, method 400 returns to step 404, and CDR driver 178 generates and transmits another I/O request. Otherwise, method 400 ends.

Figure 5:
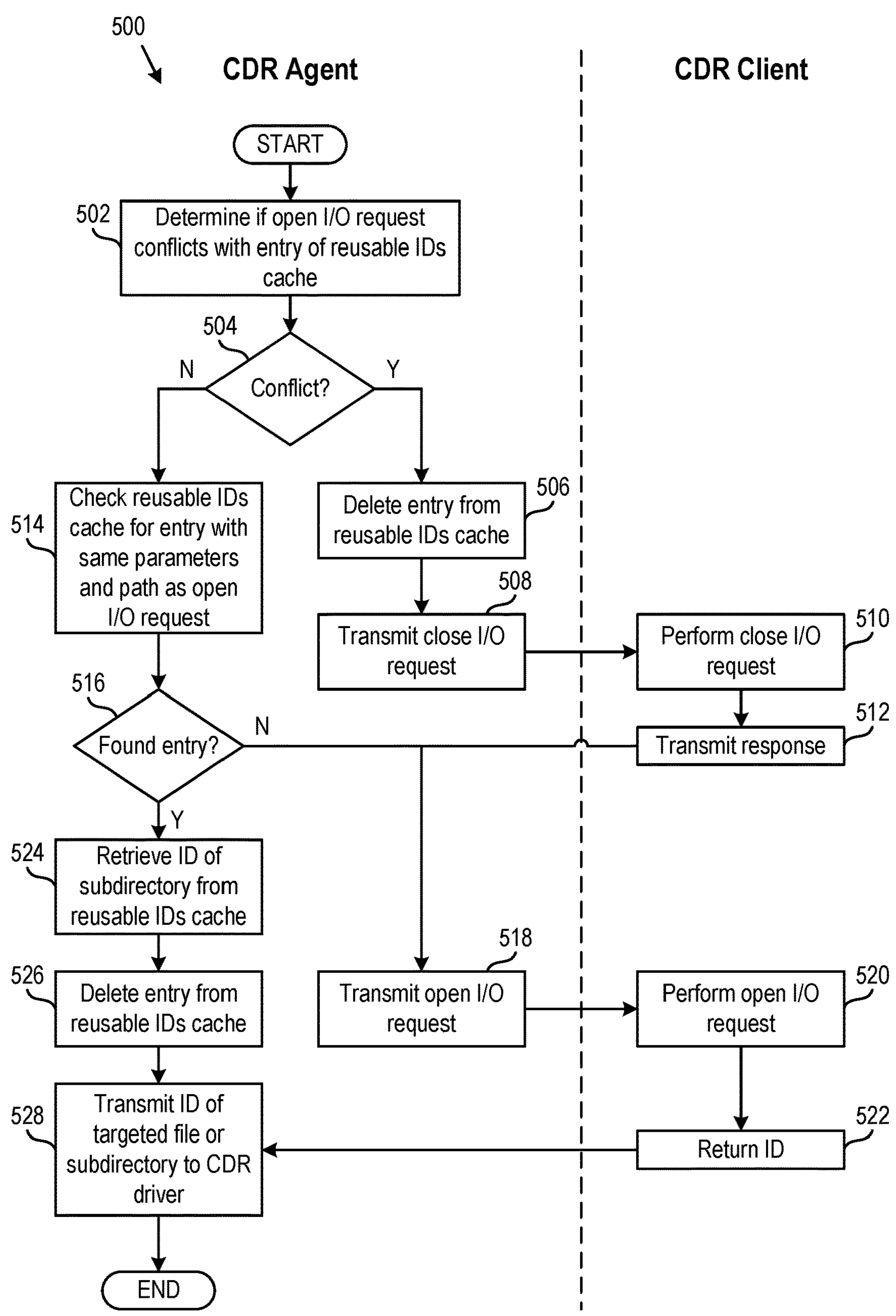
FIG. 5 is a flow diagram of steps performed by the CDR agent of the host server and the CDR client of the client computing device to carry out a method of handling an open I/O request, according to an embodiment.

FIG. 5 is a flow diagram of steps performed by CDR agent 170 and CDR client 116 to carry out a method 500 of handling an open I/O request received from CDR driver 178, according to an embodiment. At step 502, CDR agent 170 determines if the open I/O request conflicts with an entry of reusable IDs cache 172. For example, the open I/O request may include a ShareAccess flag parameter indicating that only one thread of execution should be allowed to access a subdirectory of shared directory 122 targeted by the open I/O request, also referred to herein as an "exclusive open I/O request."

If there is a conflict such as the open I/O request being an exclusive open I/O request, method 500 moves to step 506. At step 506, CDR agent 170 deletes the conflicting entry of reusable IDs cache 172. At step 508, CDR agent 170 transmits a close I/O request to CDR client 116 targeting the same subdirectory targeted by the conflicting open I/O request. At step 510, CDR client 116 performs the close I/O request by closing the targeted subdirectory. At step 512, CDR client 116 transmits a successful response to the close I/O request to CDR agent 170, and method 500 moves to step 518.

Returning to step 504, if there is no conflict, method 500 moves to step 514. At step 514, CDR agent 170 checks reusable IDs cache 172 for an entry that includes the same parameters and path as the open I/O request received from CDR driver 178. At step 516, if there is no such entry, method 500 moves to step 518. Some examples in which CDR agent 170 does not find such an entry include: (1) the open I/O request targeting a file instead of a subdirectory of shared directory 122, (2) being the first open I/O request targeting a particular subdirectory, and (3) targeting a subdirectory for which an entry of reusable IDs cache 172 has timed out.

At step 518, CDR agent 170 transmits the open I/O request to CDR client 116. At step 520, CDR client 116 performs the open I/O request by opening a targeted file or subdirectory of shared directory 122. At step 522, CDR client 116 returns the ID of the targeted file or subdirectory to CDR agent 170, and method 500 moves to step 528. Returning to step 516, if CDR agent 170 found an entry including the same parameters and path, method 500 moves to step 524, and CDR agent 170 retrieves the ID of a targeted subdirectory from reusable IDs cache 172. At step 526, CDR agent 170 deletes the entry. At step 528, CDR agent 170 transmits the ID of a targeted file or subdirectory to CDR driver 178. After step 528, method 500 ends.

Figure 6:
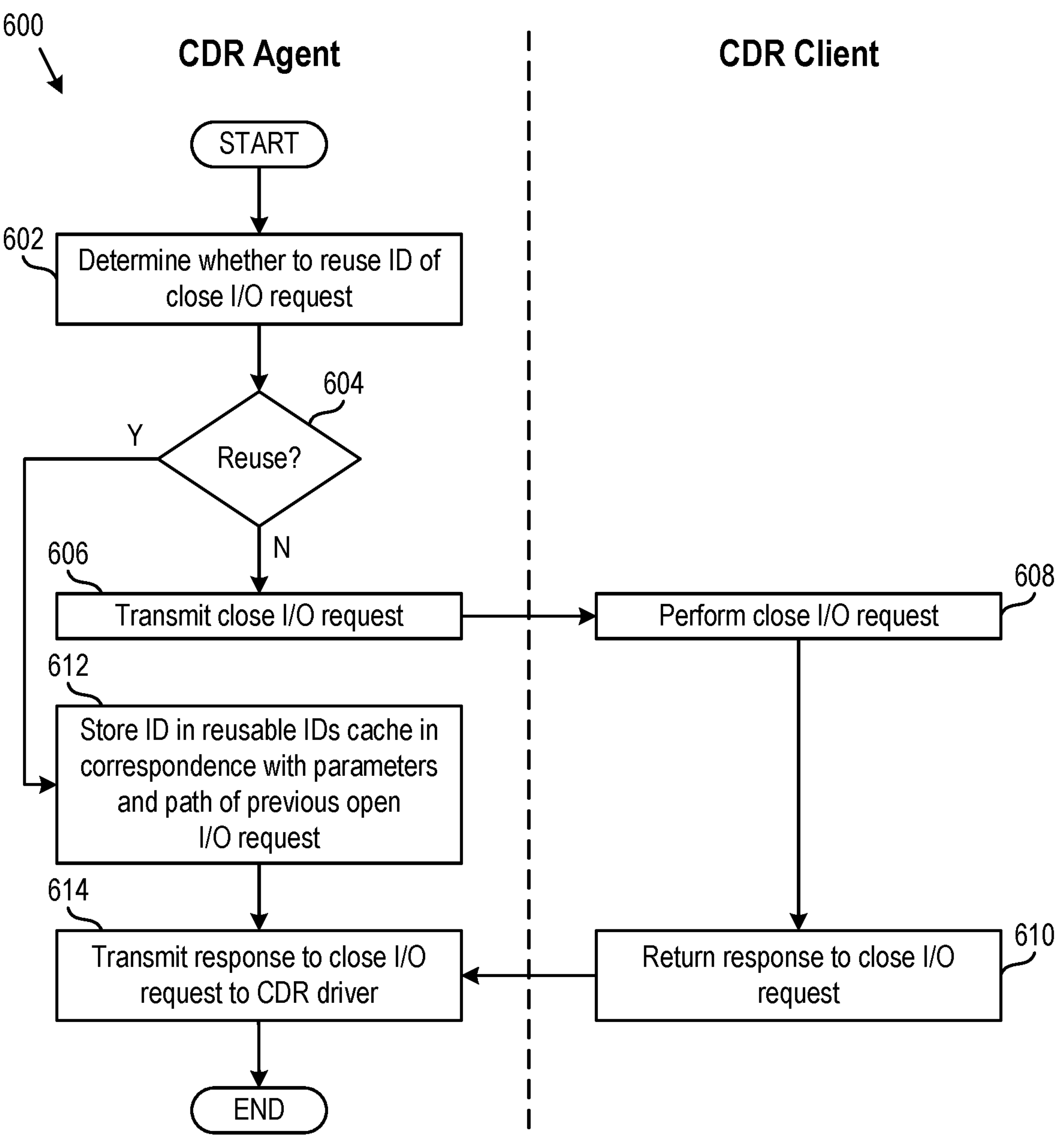
FIG. 6 is a flow diagram of steps performed by the CDR agent of the host server and the CDR client of the client computing device to carry out a method of handling a close I/O request, according to an embodiment.

FIG. 6 is a flow diagram of steps performed by CDR agent 170 and CDR client 116 to carry out a method 600 of handling a close I/O request received from CDR driver 178, according to an embodiment. At step 602, CDR agent 170 determines whether to reuse an ID specified by the close I/O request. At step 604, if CDR agent 170 determines not to reuse the ID, method 600 moves to step 606. There are various reasons why CDR agent 170 may determine not to reuse the ID.

For example, if the ID corresponds to a file and not to a subdirectory of shared directory 122, as indicated by a response to a query directory or query information I/O request, CDR agent 170 does not reuse the ID. As another example, if the previous open I/O request targeting the subdirectory of the close I/O request was an exclusive open I/O request, CDR agent 170 does not reuse the ID. As another example, CDR agent 170 checks whitelist 174, which is a predetermined group of types of I/O requests such as query directory, query information, and volume information I/O requests, that are generated by CDR driver 178 to copy files. If CDR agent 170 received a type of I/O request that is not included in whitelist 174, between the receiving of the close I/O request and the receiving of the previous open I/O request targeting the subdirectory of the close I/O request, CDR agent 170 does not reuse the ID. Adhering to whitelist 174 in this manner avoids attempting to reuse IDs during unpredictable sequences of I/O requests that could conflict with such reusage.

As another example, there may be a "pending I/O request" that fits the following criteria: (1) CDR agent 170 has already transmitted it to CDR client 116, (2) it targets the subdirectory of the close I/O request, and (3) CDR agent 170 has not yet received a response to it from CDR client 116. If there is such a pending I/O request, CDR agent 170 does not reuse the ID to avoid future I/O requests conflicting with the pending I/O request. The file should be closed at client computing device 110 so that the pending I/O request can be canceled, and future I/O requests targeting the subdirectory can proceed without undue delay.

At step 606, CDR agent 170 transmits the close I/O request to CDR client 116. At step 608, CDR client 116 performs the close I/O request by closing the targeted file or subdirectory. At step 610, CDR client 116 returns a response to CDR agent 170 indicating that the targeted file or subdirectory is closed, and method 600 moves to step 614. Returning to step 604, if CDR agent 170 determines to reuse the ID, method 600 moves to step 612. CDR agent 170 determines to reuse the ID because it corresponds to a subdirectory of shared directory 122, the close I/O request does not follow an exclusive open I/O request, the close I/O request only follows types of I/O requests included in whitelist 174, and there is not a pending I/O request targeting the subdirectory of the close I/O request.

At step 612, CDR agent 170 stores the ID in reusable IDs cache 172 along with the parameters and path of the previous open I/O request targeting the subdirectory of the close I/O request. At step 614, CDR agent 170 transmits a successful response to CDR driver 178, indicating that a targeted file or subdirectory has been closed. It should be noted that despite transmitting the successful response to CDR driver 178, if the ID corresponds to a subdirectory of shared directory 122 and is being reused, the subdirectory is still open at client computing device 110. After step 614, method 600 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are hard disk drives (HDDs), SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of performing open and close input/output (I/O) requests targeting a directory of a client computing device during a process of copying a plurality of files of the directory from the client computing device to a host server that is hosting a remote desktop accessed by the client computing device, the method comprising:

- receiving a first I/O request to open the directory, from a driver of the host server;
- forwarding the first I/O request to the client computing device;
- in response to the first I/O request, receiving an identifier (ID) of the directory from the client computing device and transmitting the ID to the driver;
- in response to receiving a second I/O request to close the directory, from the driver,
  - responding to the driver with an indication that the directory was successfully closed without forwarding the second I/O request to the client computing device,
  - storing the ID in a cache in association with a path and open parameters of the directory, and waiting for a predetermined amount of time to elapse during which unless the ID is retrieved from the cache during the predetermined amount of time;

in response to receiving a third I/O request to open the directory from the driver prior to the elapsing of the predetermined amount of time, determining whether the third I/O request conflicts with the path or the open parameters associated with the stored ID, retrieving the ID from the cache in response to determining that the third I/O request does not conflict with the path or the open parameters associated with the stored ID, and transmitting the ID to the driver again without issuing an open request to the client computing device; and in response to determining that the predetermined amount of time during which the ID is not retrieved from the cache has elapsed, forwarding the second I/O request to close the directory to the client computing device.

2. The method of claim 1, further comprising:

upon the transmitting of the ID to the driver again, removing the ID from the cache.

3. The method of claim 2, further comprising:

after the removing of the ID from the cache, and in response to receiving a fourth I/O request to close the directory, from the driver, storing the ID in the cache again, and not forwarding the fourth I/O request to the client computing device.

4. The method of claim 1, further comprising:

receiving a plurality of I/O requests from the driver between the receiving of the first I/O request from the driver and the receiving of the second I/O request from the driver; and determining that the plurality of I/O requests are each in a whitelist of predetermined types of I/O requests, wherein the storing of the ID in the cache is performed in response to the determining that the plurality of I/O requests are each in the whitelist.

5. The method of claim 1, further comprising:

determining that there are no I/O requests that fit all of the following criteria: (1) has already been transmitted to the client computing device, (2) targets the ID, and (3) a response thereto has not been received from the client computing device, wherein the storing of the ID in the cache is performed in response to the determining that there are no I/O requests that fit the criteria.

6. A non-transitory computer-readable medium comprising instructions that are executable in a remote desktop system, wherein the instructions when executed cause the remote desktop system to carry out a method of performing open and close input/output (I/O) requests targeting a directory of a client computing device during a process of copying a plurality of files of the directory from the client computing device to a host server that is hosting a remote desktop accessed by the client computing device, the method comprising:

receiving a first I/O request to open the directory, from a driver of the host server;

forwarding the first I/O request to the client computing device;

in response to the first I/O request, receiving an identifier (ID) of the directory from the client computing device and transmitting the ID to the driver;

in response to receiving a second I/O request to close the directory, from the driver, responding to the driver with an indication that the directory was successfully closed without forwarding the second I/O request to the client computing device, storing the ID in a cache in association with a path and open parameters of the directory, and waiting for a predetermined amount of time to elapse during which unless the ID is retrieved from the cache during the predetermined amount of time;

in response to receiving a third I/O request to open the directory from the driver prior to the elapsing of the predetermined amount of time, determining whether the third I/O request conflicts with the path or the open parameters associated with the stored ID, retrieving the ID from the cache in response to determining that the third I/O request does not conflict with the path or the open parameters associated with the stored ID, and transmitting the ID to the driver again; and in response to determining that the predetermined amount of time during which the ID is not retrieved from the cache has elapsed, forwarding the second I/O request to close the directory to the client computing device.

7. The non-transitory computer-readable medium of claim 6, the method further comprising:

upon the transmitting of the ID to the driver again, removing the ID from the cache.

8. The non-transitory computer-readable medium of claim 7, the method further comprising:

after the removing of the ID from the cache, and in response to receiving a fourth I/O request to close the directory, from the driver, storing the ID in the cache again, and not forwarding the fourth I/O request to the client computing device.

9. The non-transitory computer-readable medium of claim 6, the method further comprising:

receiving a plurality of I/O requests from the driver between the receiving of the first I/O request from the driver and the receiving of the second I/O request from the driver; and determining that the plurality of I/O requests are each in a whitelist of predetermined types of I/O requests, wherein the storing of the ID in the cache is performed in response to the determining that the plurality of I/O requests are each in the whitelist.

10. The non-transitory computer-readable medium of claim 6, the method further comprising:

determining that there are no I/O requests that fit all of the following criteria: (1) has already been transmitted to the client computing device, (2) targets the ID, and (3) a response thereto has not been received from the client computing device, wherein the storing of the ID in the cache is performed in response to the determining that there are no I/O requests that fit the criteria.

11. A remote desktop system comprising:

a client computing device storing a directory including a plurality of files to be copied to the host server; and a host server including a software program and a driver, wherein the software program is configured to:

receive a first I/O request to open the directory, from the driver;

forward the first I/O request to the client computing device;

in response to the first I/O request, receive an identifier (ID) of the directory from the client computing device and transmit the ID to the driver;

in response to receiving a second I/O request to close the directory, from the driver, respond to the driver with an indication that the directory was successfully closed without forwarding the second I/O request to the client computing device, store the ID in a cache in association with a path and open parameters of the directory, and wait for a predetermined amount of time to elapse during which unless the ID is retrieved from the cache during the predetermined amount of time;

in response to receiving a third I/O request to open the directory from the driver prior to the elapsing of the predetermined amount of time, determine whether the third I/O request conflicts with the path or the open parameters associated with the stored ID, retrieve the ID from the cache in response to determining that the third I/O request does not conflict with the path or the open parameters associated with the stored ID, and transmit the ID to the driver again; and in response to determining that the predetermined amount of time during which the ID is not retrieved from the cache has elapsed, forward the second I/O request to close the directory to the client computing device.

12. The remote desktop system of claim 11, wherein the software program is further configured to:

upon the transmitting of the ID to the driver again, remove the ID from the cache.

13. The remote desktop system of claim 12, wherein the software program is further configured to:

after the removing of the ID from the cache, and in response to receiving a fourth I/O request to close the directory, from the driver, store the ID in the cache again, and not forward the fourth I/O request to the client computing device.

14. The remote desktop system of claim 11, wherein the software program is further configured to:

receive a plurality of I/O requests from the driver between the receiving of the first I/O request from the driver and the receiving of the second I/O request from the driver; and determine that the plurality of I/O requests are each in a whitelist of predetermined types of I/O requests, wherein the storing of the ID in the cache is performed in response to the determining that the plurality of I/O requests are each in the whitelist.

15. The method of claim 1, further comprising:

in response to determining that the third I/O request conflicts with the path or open parameters associated with the stored ID, deleting the stored ID from the cache, transmitting, to the client computing device, a request to close the directory associated with the stored ID, receiving a response from the client computing device indicating that the directory was successfully closed, and forwarding the third I/O request to the client computing device.

16. The non-transitory computer-readable medium of claim 6, the method further comprising:

in response to determining that the third I/O request conflicts with the path or open parameters associated with the stored ID, deleting the stored ID from the cache, transmitting, to the client computing device, a request to close the directory associated with the stored ID, receiving a response from the client computing device indicating that the directory was successfully closed, and forwarding the third I/O request to the client computing device.

17. The remote desktop system of claim 11, wherein the software program is further configured to:

in response to determining that the third I/O request conflicts with the path or open parameters associated with the stored ID, delete the stored ID from the cache, transmit, to the client computing device, a request to close the directory associated with the stored ID, receive a response from the client computing device indicating that the directory was successfully closed, and forward the third I/O request to the client computing device.

* * * * *